Nov. 11, 1969　　A. O. FISCHER　　3,477,638
ACTUATOR HOLDING MEANS

Filed Feb. 21, 1968　　2 Sheets-Sheet 1

INVENTOR
ARMIN O. FISCHER
BY
ATTORNEY

Nov. 11, 1969    A. O. FISCHER    3,477,638
ACTUATOR HOLDING MEANS
Filed Feb. 21, 1968    2 Sheets-Sheet 2
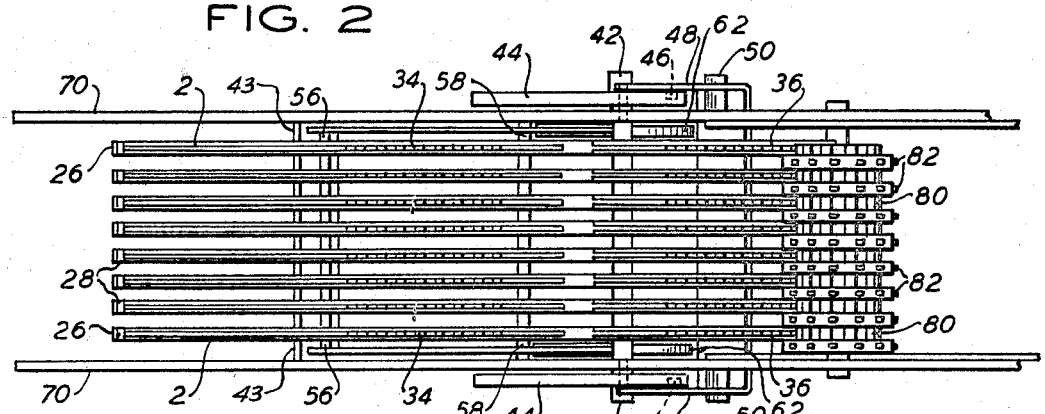
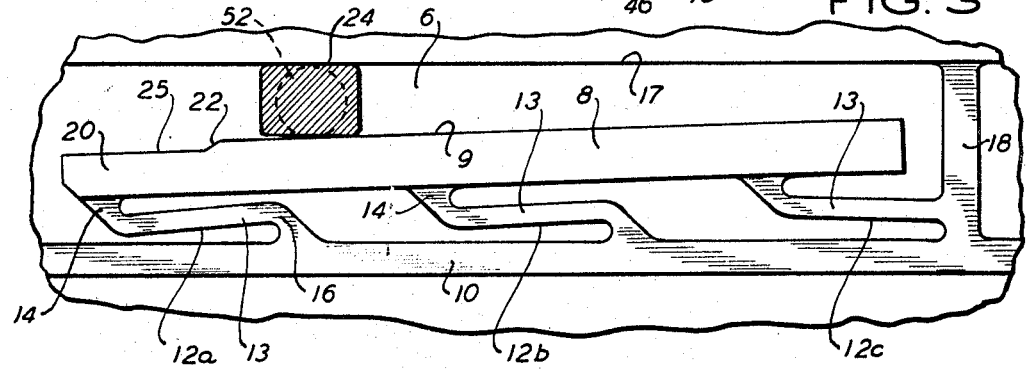
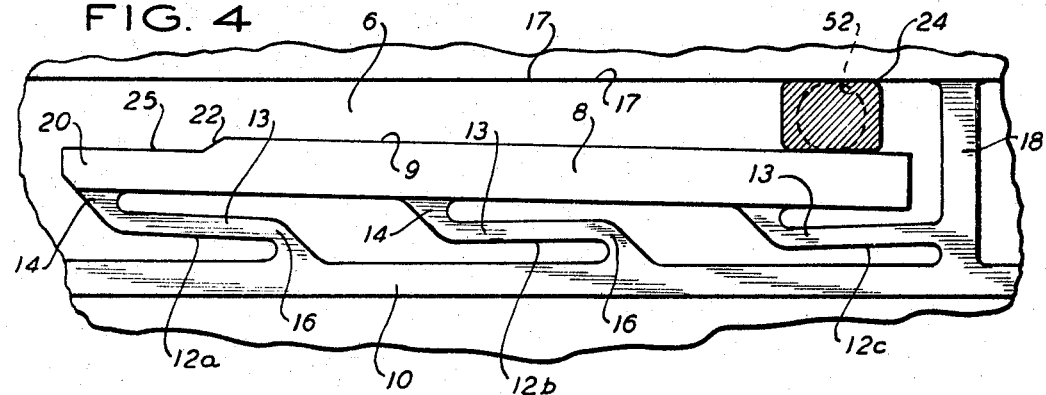
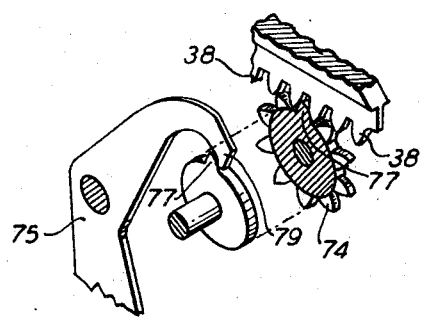
INVENTOR
ARMIN O. FISCHER
BY
Stephen E. Feldman
ATTORNEY

United States Patent Office 3,477,638
Patented Nov. 11, 1969

3,477,638
ACTUATOR HOLDING MEANS
Armin O. Fischer, Cranford, N.J., assignor to Litton Business Systems, Inc., Orange, N.J., a corporation of New York
Filed Feb. 21, 1968, Ser. No. 707,117
Int. Cl. G06c 29/00, 25/00
U.S. Cl. 235—60                                14 Claims

ABSTRACT OF THE DISCLOSURE

The actuator holding means comprises bars uniformly spring biased throughout their length, which are provided on the racks of a calculating machine. The bars apply a uniform frictional force to a rack driving bail, after it has stopped driving the racks but while it is still moving itself, to hold the racks in position against a stopping means with a constant amount of force, throughout the remaining travel of the drive bail.

BACKGROUND OF THE INVENTION

In calculating machines it is most desirable after the movement of the racks has been stopped, but while the drive means, which moved them into position is still moving, to have means on the racks which coact with the drive means to hold the racks in position against a stopping means with a uniform and constant amount of force. By exerting this force, the racks will remain in their position while the drive means is still moving.

In the prior art, various devices have attempted to accomplish this function, but these devices failed to apply a constant amount of force to the racks, and therefore, the racks could possibly move from their position during a time when an insufficient amount of force was being applied. Such movement could possibly result in an incorrect entry or result.

One such prior art device included arcuate cantilever springs positioned within circular racks. A circular drive bail rotated the racks about a common axis and then continued to move after the racks had been arrested. The cantilever springs were employed to attempt to hold the racks in position, but since the springs were of cantilever configuration, the frictional force they exerted on the drive bail was not equal throughout the length of the spring. It was greater at the point of attachment of the spring than at its free end. Thus at the free end because of inadequate frictional force, there was a possibility of a rack slipping from engagement with its stopping means and thereby, as aforementioned, yielding an incorrect answer or result.

Therefore, a need exists for a holding means that is part of the rack and exerts a uniform and constant frictional force between itself and a drive bail, as the bail continues to travel after the rack has been arrested to properly keep the rack, in its arrested position.

SUMMARY OF THE INVENTION

The invention comprises a means, which is part of a differential actuator, for applying a uniform force to the differential actuator drive means, after the differential actuator has been arrested, so that as the drive means continues its travel, the differential actuator will be held against the arresting means by a constant amount of force.

BRIEF DESCRIPTION OF THE DRAWINGS

FIG. 2 is a plan view of part of a calculating machine of FIG. 1.

FIG. 3 is an enlarged view of the holding means after a rack has been arrested by a stopping means.

FIG. 4 is another enlarged view of the holding means after a rack has been arrested by a stopping means.

FIG. 5 is an enlarged view of the stopping means which operates during a subtotal or total taking operation.

SPECIFIC EMBODIMENT OF THE INVENTION

Figure 1:
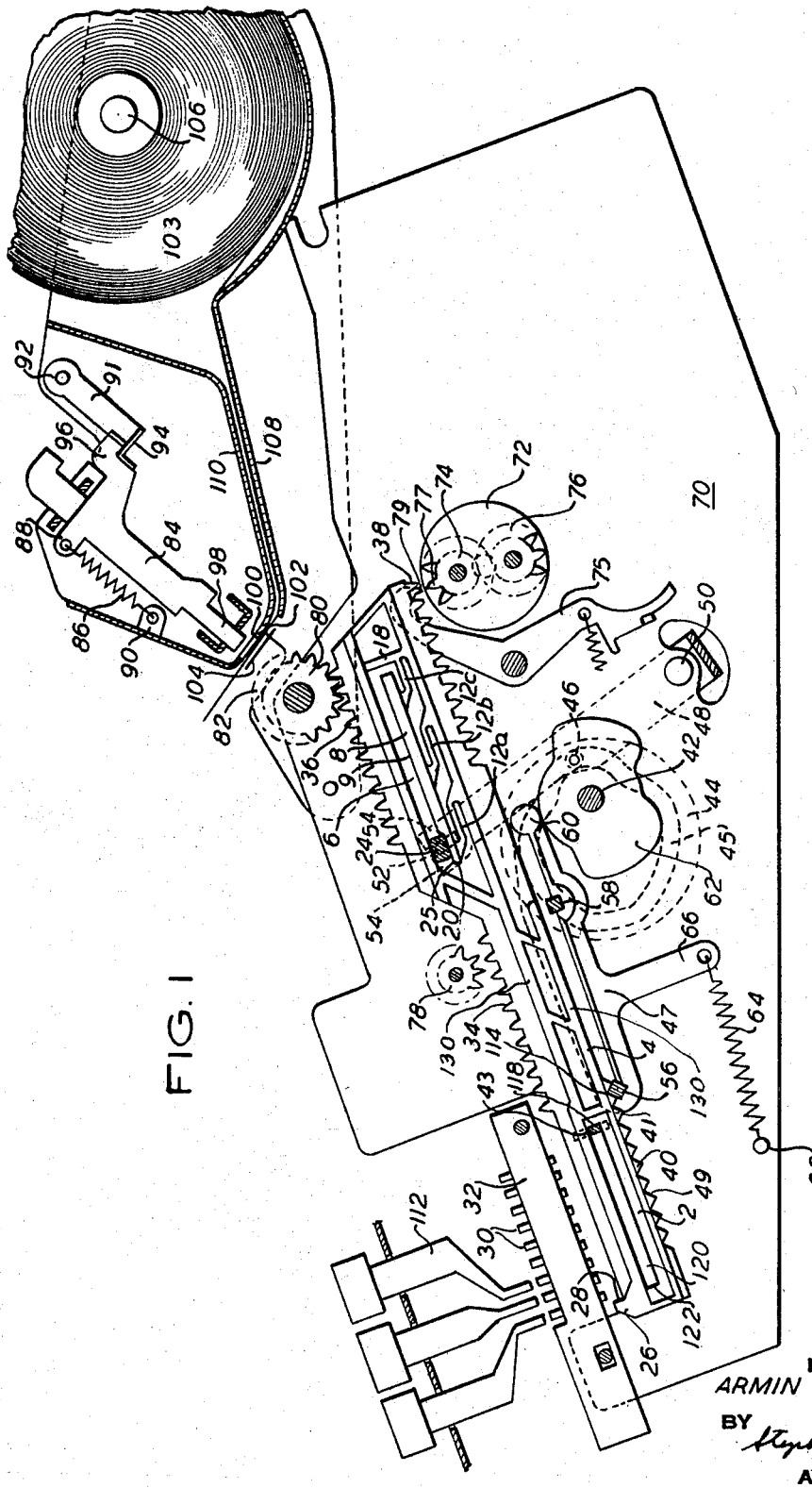
FIG. 1 is a cross sectional view of part of a calculating machine illustrating the holding means of my invention.

The invention comprises a novel holding means which is included as an integral part of a plastic rack used in a calculating machine.

The racks or differential actuators 2 which are provided for the various orders of a calculating machine, as shown in FIGS. 1 and 2, are integrally molded of plastic or other suitable material and are shaped so as to provide an opening 6 therein.

A bar 8 is positioned within this opening in each rack and is integrally connected to the bottom surface 10 of the opening by resilient members, springs 12a, 12b, and 12c.

Preferably the bar, springs, and the rack are all integrally molded together as a single plastic unit.

The springs besides supporting bar 8 also bias the bar upwardly to the normal position as shown in FIG. 1. Springs 12a and 12b are substantially "S" shaped members having a horizontal portion 13 which is the resilient part of the spring and which is positioned parallel to bar 8 and to the bottom surface 10 of opening 6.

Springs 12a and 12b are connected to bar 8 by perpendicular extension 14, and to surface 10 of the rack by perpendicular extension 16.

Spring 12c is constructed similarly to 12a and 12b, except that instead of having a perpendicular extension 16 to connect it to the rack, it is joined to strut 18 which extends perpendicularly between bottom surface 10 and top surface 17 of opening 6.

The springs are also equally spaced along the length of bar 8. The distance between springs 12a and 12b is the same as that between 12b and 12c, and preferably each exerts the same biasing force on bar 8.

Each bars 8 at its forward end (the left end as shown in FIG. 1) has a reduced thickness section 20 defining a recess wherein the drive bail 24 normally is positioned. This section is constructed so that the drive bail can be fitted between its surface 25 and surface 17 of a rack without deflecting the bar or the springs 12 which bias it. The functioning of the drive bail will be discussed in more detail hereinafter.

A shoulder 22 connects section 20 to the remainder of bar 8. The shoulder against which the drive bail is positioned when it moves the racks, will be discussed in greater detail subsequently.

Also includes on the racks are projections 26 at the forward ends thereof (to the left in FIG. 1). These projections extend perpendicularly and upwardly from the racks as shown in FIG. 1 and have a flat vertical surface 28 at the rear thereof (the right side in FIG. 1). This surface, as will be described subsequently, may contact a depressed pin 30 of the pin carriage 32 to arrest the motion of a rack.

Also contained on each rack are three sets of gear teeth 34, 36, and 38. These teeth are employed respectively in multiplication, printing out and addition, subtraction, and total taking, as is hereinafter described. Also, projecting from each rack are a series of V-shaped teeth 40 which extend along the lower surface of the rack proximate the front end thereof. These teeth are engaged by aligning means 47 to hold the rack in position, as will also be subsequently described.

Referring again to the drive means, it consists of a motor or other motivation means which drives shaft 42 to cause cam 44 to rotate in a clockwise direction. The motion of this cam causes cam follower 46 which rides in a groove 45 in the cam to move in a horizontal direction from left to right as shown in FIG. 1. As the follower moves it causes arm 48 on which it is positioned to be rocked in a clockwise direction about pivot pin 50. The rocking of this arm moves drive bail 24, which is engaged by the arm, in a horizontal direction from left to right in FIG. 1. To engage the drive bail and the arm together shaft 52 which projects from the end of the drive bail fits between extensions 54 of the arm.

When the drive bail is not in motion aligning means 47 is provided to hold the racks in position. The aligning means comprises a T-shaped member having a square pin 56 at one end thereof. The member is rocked about square shaft 58 to move a square pin 56 thereon into and out of grooves 49, by having a cam follower 60, located on its extreme right end (as shown in FIG. 1), follow the surface of cam 62 as the cam is rotated by shaft 42. Therefore, as cam 62 rotates in a clockwise direction, the aligning means will be pivoted in a counterclockwise direction and then restored to its position as shown in FIG. 1 in a clockwise direction.

To assist in restoring the aligning means, a spring 64 is provided. The spring is connected between arm 66 of the aligning means and a pin 68 attached to a machine frame 70.

The machine frames as shown in FIGS. 1 and 2 are flat structures of metal or plastic which support the various mechanisms of the calculator including the mechanism of the present invention.

Referring back to the racks, teeth 38 in the lower rear end of each rack engage flipover register 72. The register which is a conventional flipover accumulator register, as used for totals, subtotals, and adding and subtracting, has an addition gear 74 and subtraction gear 76 in each order. The register also has a suitable tens transfer means, of which only the primary transfer hook 77 is shown. The operation of the tens transfer means is decsribed in more detail in Application SN 633,449 filed Apr. 25, 1967, entitled Registering Mechanism by Herman Gang, and assigned to the assignee of the present invention.

Control means (not shown) are provided for the flipover register to revolve the register so that either gear 72 or gear 74 is in position to engage teeth 38 of the rack depending on whether addition or subtraction is desired. Also, suitable controls (also not shown) are provided to raise the register so that its gears engage the rack to enter an amount into the gears or to read an amount out thereof.

For using the racks for multiplication, a multiplier register 78 is provided. The register is brought into and out of engagement with teeth 34 on the middle upper edge of each rack during a multiplication operation, as will be described subsequently.

For printing out the amount in the racks, a printing unit is provided. The printing unit is connected to the racks by means of register gears 80 which are always in engagement with teeth 36 of the racks. On the same shaft as these register gears 80 or integral therewith are type wheels 82 which preferably have the digits 0–9 located around the surface thereof. These type wheels are coordinated with suitable hammer means for printing out results or entries on paper or other suitable material.

As shown in FIG. 1, the hammer means comprises a hammer member 84 which is spring biased toward type wheels 82 by spring 86. The spring is connected between arm 88 of the hammer and arm 90 which is attached to part of the housing of the calculator.

When it is desired to print a value the hammer is actuated by rotating hammer arresting member 91 in a counterclockwise direction about pivot point 92 so that its lower extension 94 is removed from engagement with arm 96 of the hammer. This releases the hammer and causes it to travel under the influence of biasing spring 86 toward type wheels 82. In this travel, its lower end 98 (as shown in FIG. 1) will pass through opening 100 in the calculator housing to impact a sheet of paper and cause an image to be printed thereon. The image is produced by the sheet of paper 102 which is located directly beneath end 98 of a hammer being pressed against the type wheels while a printing ribbon 104 is positioned between the paper and the type wheels.

The paper is fed from roll 103 which is journalled on a suitable shaft 106 so that a continuous sheet of paper can be fed between guide plates 108 and 110 into proximity with the hammer and type wheels, as aforementioned.

The pin carriage which was briefly mentioned previously is of conventional construction comprising a carriage 32 which moves from lower to higher order across the machine. Within the carriage are a series of pins 30, nine for each order. These pins are depressed by the actuation of numeral keys 112, which are conventional in configuration being ten in number, 0–9, each one of which is aligned with and will depress a particular one of the pins in each order of the pin carriage, except for the 9 key. For the nine kep no pin will be depressed, the rack instead will travel its full distance until it is stopped by bail 43. This will be described in more detail subsequently.

The parts of the mechanism in the above description will now be coordinated in describing its operation in detail: An amount is entered into the pin carriage by the depression of keys 112 so that corresponding pins 30 in each order of the pin carriage 32 are depressed. A function key (not shown) is then actuated to cause shaft 42 and thereby cams 62 and 44 to begin to rotate. The rotation of cam 62 will cause cam follower 60 which rides its surface to rock alignment means 42 in a counterclockwise direction about pivot 58 and thereby removes square pin 56 from its normal position as shown in FIG. 1. Slightly after square pin 56 has begun to move out of one of the grooves 49 and just as its tip 114 clears tip 41 of teeth 40, cam 44 begins to move cam follower 46 to thereby rock arm 48 and cause drive bail 24 to move in a horizontal direction. The drive bail then begins to move the racks to the right in FIG. 1, since it is positioned against shoulder 22 of bar 8. Each rack continues to move to the rear until surface 28 of projection 26 thereon contacts a depressed pin 30 or other stopping means. At this point since the drive bail is still moving even though the rack is stopped from moving the lower surface of the drive bail will ride over the sloping surface of shoulder 22 and begin to travel between the upper surface 9 of bar 8 and surface 17 of the rack. This is more clearly shown in FIGS. 3 and 4.

As it begins this travel, the forward end of bar 8 is depressed (the left end as shown in FIG. 3), since the space between surface 17 and surface 9 of the bar is smaller than the height of the drive bail. Depression of the bar will cause the springs 12 to flex and thereby to bias the bar upwardly toward its normal position against the drive bail. The drive bail will now still be able to move but there will be sufficient frictional force between its surfaces and surface 9 of the bar and surface 17 of the rack to hold the rack in its rear stopped position with projection 26 in contact with a depressed pin 30. It is most important that the rack be held in the rear position against a depressed pin so that it will not move and thereby assume an incorrect position which would lead to a wrong value entry or result.

By use of three equal springs 12 and a horizontal bar the biasing frictional force applied to the drive bail will be uniform throughout its path of travel from the starting position to the left of that shown in FIG. 3 to the ultimate position shown in FIG. 4.

It is noted that for the drive bail to move to the position of FIG. 4 a rack will have to be held completely in the forward position with no movement at all. This will only happen when a zero is entered therein since then a zero pin of the pin carriage, the leftmost one in FIG. 1, will be depressed and projection 26 will contact the pin so that there is virtually no movement of the rack. The drive bail will thereby move the full distance along surface 9 of bar 8 to the position of FIG. 4. With all other entries other than zero, the drive bail will move proportionally shorter distances. For example, FIG. 3 illustrates a rack with seven entered therein. FIG. 3 is also illustrative of a position in the movement of the drive bail where less than seven has been entered in a rack. In that case, the bail will continue to move to the right from the position of FIG. 3 depending on the value entered in the rack. As aforementioned, if a zero was entered, the bail would travel to the position of FIG. 4. However, if more than zero was entered, it would move to a position which is to the left of that in FIG. 4.

It will, therefore, be seen that because the drive bail may move a significant distance before it is stopped, and therefore before some more permanent holding means (such as the aligning means 47) is actuated to hold the racks in position, the frictional force between the drive bail and a rack must be uniformly sufficient throughout its travel so that the rack does not accidentally move. This is especially significant toward the end of its travel, where a lessening of force may lead to slipping of the rack.

Applicant has thereby overcome a problem which troubled prior art devices, i.e., that the frictional holding force might tend to lessen toward the end of the travel of the drive bail, to cause a rack to slip from its intended position. As aforementioned, such slippage of a rack might result in an incorrect value being registered by the rack.

Referring back to the operation of the mechanism, after the drive bail 24 has completed its travel, aligning means 47 is rocked clockwise by its cam follower 60 which follows the surface of cam 62. The movement causes square pin 56 to be inserted into one of the grooves 49 to thereby hold the racks in the rearward position to which they have moved.

While the racks are held in this position, preparation for the calculating functions and the printing function will take place. To effect the printing function i.e., to print the amount in the racks, each gear of register 80 and its associated print wheel 82 has been rotated a number of teeth which correspond to the movement of each rack. The gears of register 80 will be rotated as the racks are moved since the two are always in mesh. At this point, with the paper and the printing ribbon in place between hammer 84 and the type wheels, the hammer is actuated, as previously described, to print out the amount in each rack.

Now, if addition or subtraction is to take place, flipover register 72 will move upwardly so that either its subtraction gear or addition gear will engage teeth 38 of a rack. Then when the rack is moved forwardly, the amount in the rack will be entered into the flipover register.

If a total or a subtotal is being taken, then the racks will move to the rear in the same manner as previously described, but since no values are entered there will not be any depressed pins in the pin carriage to stop the racks. Instead, before the racks begin their travel, the flipover register gears will be brought into engagement with rack teeth 38. The register gears will thereby be rotated until the ends 79 of transfer hooks 75 associated therewith contact an extended tooth 77 on a respective gear. The tooth as shown in more detail in FIG. 5, extends between the planes of the hook and the other teeth of each register gear so that when the hook contacts the extended tooth, it will stop movement of the gear; and since the gear and rack are in mesh, this will stop the movement of the corresponding rack. Because the extended tooth is in the zero position, each flipover register gear will be rotated until the value therein is read out and transferred to its corresponding rack before the movement of the rack is stopped by reaching the zero position and thus contacting the transfer hook. In other words, hook 75 will stop the movement of the flipover register gear when the gear has been rotated back to zero. In this situation, the drive bail 24 will operate with respect to bar 8 in the same manner as aforementioned to keep the racks in position, though now it will be to keep the racks in contact with the extended teeth and transfer hooks and not with the depressed pins of the pin carriage, but otherwise, operation is exactly the same.

Now referring back to total and subtotal operation, if a total is being taken, the flipover register will be moved out of engagement with the racks before the racks return to their home position, so that the amount that was in a rack is not re-entered into the flipover register. On the other hand, if a subtotal is being taken, the flipover register will remain in engagement with the racks so that when the racks are returned to their home position, the amount in the racks will be re-entered into the flipover register since the racks and register are still in engagement. It is also noted that in either the subtotal or total operations, a print cycle will take place before the racks return, in the same manner as before, to print out the amount in the flipover register.

Referring now to multiplication, the multiplier is entered into the pin carriage by depressing numeral keys 112. A suitable key (not shown) is then depressed to cause register 78 to move down into engagement with teeth 34 of the racks so that the amount is entered into the register. The multiplicand is then entered into the pin carriage and suitable mechanism rotates the multiplier gear one position with each cycle of the machine in the conventional manner until a product is reached. The product is then read out and printed, in substantially the same manner as described before with respect to a total taking operation.

The operation to return the racks to the home position will now be described. Cam 62 rocks aligning means 42 in a clockwise direction to remove pin 56 from a groove 49. As the pin clears tip 41 of teeth 40, arm 48 which is driven by cam 44 moves drive bail 24 toward the home position of FIG. 1. During the first part of this movement of the drive bail, it will be frictionally held between surface 9 of member 8 and surface 17, so that in moving toward the front of the machine, the drive bail will move the racks with it and thereby return them to their home position (the position of FIG. 1). In moving them to their home position, their movement will continue until they contact bail 43. The bail which is more clearly shown in FIG. 2 runs the width of the machine and contains comblike fingers which fit in openings 120 of each of the racks. The racks will stop when the rear edge 118 of opening 120 in each rack contacts bail 43.

Bail 43 as aforementioned also acts as a limiting stop in the rearward direction of movement of the racks. When a nine is entered into the pin carriage, since there is no 9 pin the rack will move rearwardly until surface 122 of opening 120 contacts bail 43 to stop movement of the rack.

Referring again to the return movement of the racks, after bail 43 has stopped the racks in their home position, drive bail 24 continues to travel until it is finally seated in its home position in contact with section 20 of bar 8, as shown in FIG. 1. Once the drive bail is in its home position the aligning bail will then be rotated once again in a clockwise direction so that its square pin 56 is seated in the rightmost groove 40 of each rack to hold the racks in their home position of FIG. 1.

It is noted that the racks are of one piece plastic construction included bars 8 and springs 12 and have suitable stiffening members 130 molded therein. They are preferably linear and not circular since linear racks have the advantage of constant speed at any point along their length whereas circular racks have differing linear speeds with a change in radius. A linear rack is thus far easier to construct and operate.

It will be appreciated that a group of small springs 12 have been provided instead of one large spring. The small springs tend to distribute the load more evenly and to thus lessen fatigue and eventual failure of each individual spring. Also, with these springs only one and occasionally two of the three springs are flexed during any particular time of the operation (see FIGS. 3 and 4) and thereby the use of each spring is greatly diminished from what it would be if only one spring were employed.

It also will be appreciated that by having a frictional force exerted on two surfaces of the drive bail, it is in contact with surface 9 of bar 8 and surface 17 of a rack, a sufficient frictional force can be applied with less strain on the mechanism than if the bar were used alone. Finally, the surfaces of the drive bail in contact with surface 9 of the bar and surface 17 of the rack are both flat and parallel to surfaces 9 and 17 so that a greater frictional area of contact is provided to thereby provide a sufficient holding force, with less strain on the springs.

While specific embodiments of the invention have been illustrated, it will be appreciated that it is not limited thereto since many modifications may be made by one skilled in the art and the appended claims are intended to cover all such modifications as fall within the true spirit and scope of the invention.

I claim:
1. A calculating machine including
    a differential actuator,
    stopping means for arresting the movement of the actuator,
    drive means for moving the actuator, and
    holding means, included in said actuator and including a member which is uniformly biased throughout its length in a given direction, for applying a substantially uniform amount of force to the drive means after the actuator has been arrested by the stopping means and during the continued operation of the drive means so that the drive means holds the actuator against the stopping means with a uniform amount of force.
2. The calculating machine of claim 1 wherein said holding means also includes a resilient means which biases said member.
3. The calculating machine of claim 2 wherein said actuator contains a surface, wherein said member comprises a bar having a surface parallel to said actuator surface, and said resilient means comprises a plurality of springs which bias the bar uniformly toward the actuator surface.
4. The calculating machine of claim 3 wherein said member, said springs and said actuator comprise an integral unit.
5. The calculating machine of claim 4 wherein said integral unit is formed of plastic material.
6. The calculating machine of claim 3 wherein said actuator surface comprises one of the surfaces in said actuator which define an opening therein, and wherein said bar and said springs are positioned in the opening so that said springs attach the bar to the actuator and support it in the opening.
7. The calculating machine of claim 6 wherein said drive means comprises a bail which extends through the opening in said actuator and is positioned within said opening between said surface of said bar and said actuator surface, and
    wherein when said differential actuator has been arrested by said stopping means and said bail continues to move there will be a uniform frictional force applied between the bail and the actuator and between the bail and the bar, by said bar being biased uniformly against said bail, to hold the actuator in its arrested position against said stopping means.
8. The calculating machine of claim 7 wherein said bar contains a shoulder therein, and
    wherein said drive bail normally contacts said shoulder to move said differential actuators until they are arrested by said stopping means, and
    wherein when said actuator is arrested the drive bail moves over the shoulder to be frictionally biased between said actuator surface and the surface of said bar.
9. The calculating machine of claim 8 wherein the surface of the actuator to which the springs are connected is parallel to the surface of the bar.
10. The calculating machine of claim 9 wherein the plurality of the springs comprises three springs which have the same spring biasing force.
11. The calculating machine of claim 10 wherein the springs are equally spaced along said bar.
12. The calculating machine of claim 11 wherein said bar contains means defining a recess adjacent said shoulder wherein said drive bail is located when it moves said actuator before the actuator is arrested by the stopping means and wherein when said drive bail is located in the recess it will be independent of any biasing force by said bar.
13. The calculating machine of claim 12 wherein said drive bail has flat surfaces which are parallel to said actuator surface and the surface of said bar and wherein each respectively contacts said actuator surface and the surface of said bar.
14. The calculating machine of claim 13 wherein a plurality of said actuators are provided one for each order of the machine.

References Cited
UNITED STATES PATENTS

| | | | |
|---|---|---|---|
| 2,904,248 | 9/1959 | Gelling | 235—60 |
| 3,057,548 | 10/1962 | Logie | 235—60 |
| 3,095,143 | 6/1963 | Oldenburg et al. | 235—60 |
| 3,384,302 | 5/1968 | Riley | 235—60.41 |

STEPHEN J. TOMSKY, Primary Examiner

U.S. Cl. X.R.
235—131